Feb. 24, 1970  R. E. HINELINE  3,497,408
METHOD AND APPARATUS FOR BUILDING TIRES
Filed Sept. 2, 1966  3 Sheets-Sheet 1

FROM EXTRUDER

INVENTOR.
ROBERT E. HINELINE
BY
ATTORNEY

Feb. 24, 1970  R. E. HINELINE  3,497,408
METHOD AND APPARATUS FOR BUILDING TIRES
Filed Sept. 2, 1966  3 Sheets-Sheet 2

INVENTOR.
ROBERT E. HINELINE
BY 
ATTORNEY

Feb. 24, 1970  R. E. HINELINE  3,497,408
METHOD AND APPARATUS FOR BUILDING TIRES
Filed Sept. 2, 1966  3 Sheets-Sheet 3

INVENTOR.
ROBERT E. HINELINE
BY
ATTORNEY

United States Patent Office 3,497,408
Patented Feb. 24, 1970

3,497,408
METHOD AND APPARATUS FOR BUILDING TIRES
Robert Earl Hineline, Akron, Ohio, assignor to American Machine & Foundry Company, a corporation of New Jersey
Filed Sept. 2, 1966, Ser. No. 576,888
Claims priority, application Great Britain, Sept. 14, 1965, 39,144/65
Int. Cl. B29h 17/02
U.S. Cl. 156—130       15 Claims

ABSTRACT OF THE DISCLOSURE

This invention is for an apparatus and method for applying tread material to a tire and controlling the thickness of tread material applied to a casing. The apparatus includes sensing means to monitor elastomeric tread material as it is applied or just after it is applied to the tire casing and producing a resultant output signal, a template corresponding to the contour of the tread to be applied, a template tracer responsive to the rise of the template at a point corresponding to the point of sensing and means for comparing the position of the sensing means with the position of the template tracer and controlling the distance between adjacent strips of tread material to vary the degree of overlap, thereby producing a tread thickness at each point across the tire surface which corresponds to the thickness indicated by the template. In terms of the method, the invention covers winding a continuous strip of tread material in a series of overlapping terms, sensing the strip during or after application, tracing a template which corresponds to the desired configuration with a control means, comparing the output of the sensor with the output signal from tracing the template configuration at each point across the tire surface and positioning a succeeding winding at a predetermined distance from the sensed winding thereby achieving a wound tire casing that conforms to the template configuration.

This invention relates to tire manufacture and particularly to an apparatus for controlling the thickness of tread material applied to a tire casing.

One of the steps in the manufacture of new and retread tires involves the application of tread material to a particular type casing which is in the uncured state ready for molding. The tread is formed by applying a strip of unvulcanized polymer to the casing in the form of a spiral wrap with overlapping turns, the degree of overlap determining the thickness of the applied polymer at any point across the surface of the casing. A typical apparatus for building a tread on pneumatic tires is disclosed in Patent 3,223,572 to R. L. Holloway et al. and a typical method is disclosed in Patent 3,177,918 to R. G. Holman.

While the foregoing patents disclose means for regulating the application of tread to the casing and another such means is disclosed in the application of Rudolph G. Holman, Ser. No. 299,947, filed Aug. 5, 1963, now U.S. Patent No. 3,308,000 and assigned to applicant's assignee, the present invention relates to a new and improved means for monitoring and controlling the thickness of the applied uncured tread material. With apparatus of the prior art, it is often necessary to make a trial run in order to set the program which determines the mode and amount of tread material to be applied. This is uneconomical, however, in the large tire sizes because of the amount of rubber polymer and the time and effort required to perform the run.

Accordingly, it is the principal object of this invention to provide a new and improved control means to regulate the application of tread material to either a buffed tire casing or a green tire casing.

Another object of this invention is to provide a means for applying a predetermined tread thickness to a tire casing regardless of the base or casing to which the tread is applied.

It is another object of this invention to provide a method and apparatus for monitoring a strip of tread material after it is applied to a tire casing and varying the degree of overlap between adjacent strips in order to obtain a predetermined tread thickness.

It is a further object of this invention to provide means for sensing the tread material after it is applied to the casing, comparing the output of the sensing means with a predetermined template arrangement and controlling the distance between adjacent strips to produce a tread thickness at each point across the tire which will correspond to the desired thickness as indicated by the template.

With the above and other objects and advantages in view, the present invention relates to an apparatus for controlling the thickness of tread material applied to a casing. The apparatus comprises sensing means for monitoring an elastomeric ribbon of tread material as it is applied or just after it is applied to the casing and producing a resultant output signal, a template which corresponds to the tread contour to be applied, a template tracer which is responsive to the rise of the template at a point corresponding to the point of sensing, and means for comparing the position of the sensing means with the position of the template tracer and controlling the distance between adjacent strips of tread material so as to vary the degree of overlap and thus produce a tread thickness at each point across the tire surface which will correspond to the desired thickness as indicated by the template.

Other objects and advantages of the invention will be apparent from the following detailed description when read in conjunction with the accompanying drawings wherein.

Figures 1, 2:
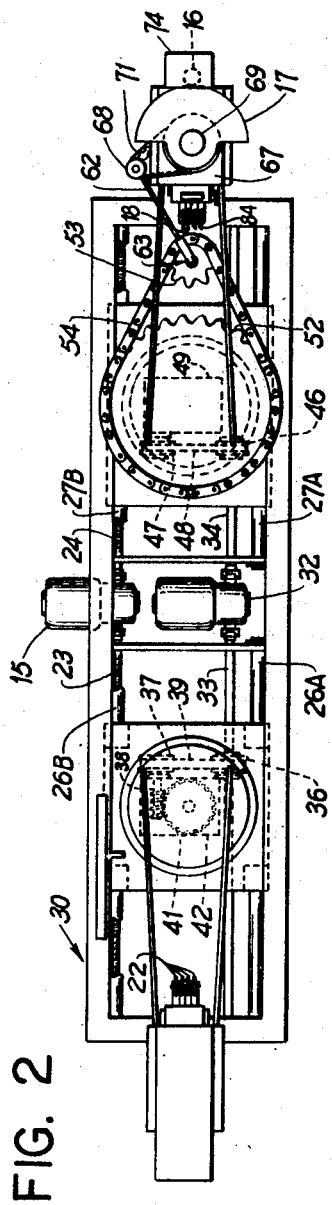
FIG. 1 is a side view of the invention with portions cut away to more clearly illustrate the functioning thereof.
FIG. 2 is a top view of the invention.
Figure 3:
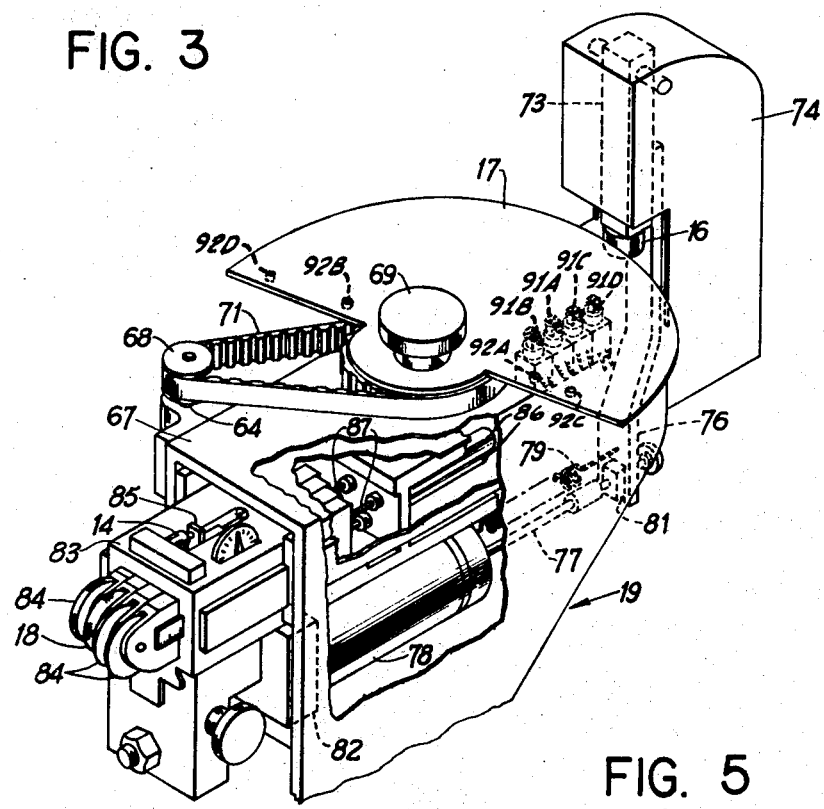
FIG. 3 is a perspective view of the sensing head and template arrangement.

Referring now to the drawings, the invention relates to an apparatus for controlling the thickness of tread material 10 applied to a tire casing 11. Accordingly, a tire casing or carcass 11 is mounted on a basic turning device such as hub 12 and rotated about its rolling axis 13. A strip 10 of polymer comprising the tread material is fed from an extruder or mill which is positioned nearby and applied to the rotating carcass 11 with successive windings overlapping to form a tire of the desired tread thickness. The drive for rotating the mounted tire casing 11 is of the variable speed type, controlled by the slack in the strip 10 so as to match the speed of extrusion or mill take-off. This part of the apparatus is basically disclosed in the various "Orbitread" patents such as Patents 3,177,- 918, 3,223,572 and 3,264,162 and consequently will not be described in detail herein.

In the present invention, a sensing switch 14 monitors the ribbon 10 which is usually two or three inches wide after it is applied to the casing at a point approximately 180° from the point of application. At the same time, a template tracer such as roller 16 follows the outline of a template 17 which corresponds to the tread contour to be applied. Means are provided for comparing the position of the sensing roller 18 with the position of the cam follower or tracer 16 and controlling the distance between adjacent strips 10 so as to vary the degree of overlap and thus produce a tread thickness at each point across the tire corresponding to the thickness represented by the template 17. One advantage of the invention resides in the fact that the tire building apparatus will always build to the shape determined by the template 17 regardless of the buffed diameter or buffed contour of the casing 11.

In the embodiment of the invention illustrated in FIGS. 1 and 2, the sensing roller 18 and template 17 are mounted on the sensing arm 19 while the heated strip 10 is applied to the casing 11 by the application arm 21 containing the application rollers 22. The arms 19 and 21 are located on opposite sides of the casing 11 and are coupled together by suitable linkages so that they may be driven in opposite directions but in synchronization. Thus, as the application arm 21 moves transversely with reference to the casing surface, the sensing arm 19 also moves transversely across the surface to track the most recently applied strip 10 of elastomeric material on the other side of the casing 11.

The motor 15 is connected to the oppositely threaded shafts 23 and 24 to drive the respective arms 21 and 19 to and fro along the guide shafts 26A and 26B and 27A and 27B through individual couplings 25 in order to accommodate various size tires. The shafts 26A and 26B are supported at their ends by the vertical portion 28 of the base 30 and the intermediate member 29. Similarly, the shafts 27A and 27B are supported by the member 31 and the vertical base portion 35. The motor 15 is activated by a control switch (not shown) to move the arms 19 and 21 either together or apart to facilitate mounting of the particular size casing 11 on the hub 12 at the start of an operation. The motor 15 is used, in effect, to set the winding radius for the tire. Safety switches (not shown) may be mounted on the base 30 to prevent overtravel of the arms 19 and 21.

The motor 32 is coupled to the square drive shafts 33 and 34 to provide rotational movement of the respective arms 21 and 19 as the strip 10 of tread material is wrapped about the rotating casing 11. The rotational movement is transmitted to the arm 21 by the drive pulley 36 which is connected to pulley 37 on the shaft of worm 38 by belt 39. The worm 38 drives meshing gear 41 within the gear box 42 and causes rotation of an axially mounted stub 43. The stub 43 is connected to the arm 21 which is journaled in the bearing means 44.

The sensing arm 19 is driven in the same manner as the application arm 21 and in synchronization therewith. Pulley 46 drives pulley 47 through a belt connection 48 resulting in movement of worm gears (not shown) within the gear box 49. The arm 19 is journaled in bearings 51 and driven off the gear box 49 through a coupling arrangement similar to that previously described with reference to arm 21.

A sprocket 52 is mounted about the base of the sensing arm 19 to transmit the rotational movement of the arm 19 to a driven sprocket 53 through chain 54. The The sprocket 53 drives the vertical shaft 56 which is journaled in bearings 57 and 58 and held in position by supporting members 59 and 61. The shaft 56 is joined to shaft 62 at one end by a coupling arrangement 63 and the shaft 62 is connected to shaft 64 at its other end by coupling 66. The shaft 64 is journaled in the frame 67 and includes a driving pulley or sprocket 68 at its upper end.

The template 17 is rotatably mounted on the frame 67 by means of a knob 69 and is driven by means of a T-belt transmission 71 which transmits the motion of sprocket 68 to driven sprocket 72. The drive arrangement for the template 17 is designed to cancel the rotational movement of the arm 19 so that the template 17 maintains the same fixed orientation with respect to the fixed base 30 of the machine regardless of the position of the swinging arm 19. The template follower 16 is mounted to the pivotal member 73 within the upper portion 74 of the frame 67. The follower arrangement includes a downwardly extending member 76 which is connected to the cylinder rod 77 of a pneumatic positioning and pressure cylinder 78. A spring 79 maintains a constant pressure of the lower adjustable portion 81 of member 76 against the cylinder rod 77. The pneumatic drive means 78 may be a double-ended air cylinder having a servo valve 82 connected thereto to regulate the flow of air to the cylinder in accordance with signals received from the sensing means.

The pneumatic drive means 78, upon actuation, positions the stitcher box 83 including the sensing roller 18 and switch 14 in a designated direction. Thus, as the arm 19 containing the sensing roller 18 and template 17 traverses the tire section, the sensing stitcher box 83 will trace the outline of the finished tread contour. The phase relationship of the applicator arm 21 and the sensing arm 19 is established so that the sensing roller 18 tracks the newly applied ribbon 10 near its outer edge. The other rollers 84 serve as gauging and stitching rollers for the recently applied ribbon 10.

The sensing switch 14 is mounted on the slidable stitcher box 83 and is intermittently engaged by the actuator 85 which is coupled to the sensing roller 18. The sensing roller 18 traces the tire outline and as the roller 18 moves in and out the switch 14 is closed and opened at intervals depending upon the tread contour. The sensing roller 18 and the stitching rollers 84 are each backed by individual air cylinders 86 having cylinder rods 87 connected to the rollers. The air cylinders 86 are designed to maintain a predetermined pressure on the respective rollers 18 and 84. The combined pressure exerted by the four cylinders 86 is less than that exerted by the cylinder 78 so that the stitcher box 83 may be moved against the action of the cylinders 86.

Figure 5:
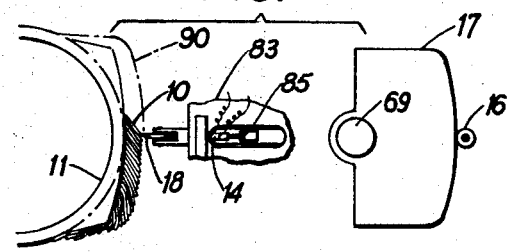
FIG. 5 is a schematic view illustrating the application of tread material to a buffed casing.

The sensing switch 14 controls the azimuth motor 32 which regulates the rotational movement of the arms 19 and 21 and hence the transverse movement of the sensing roller 18 with respect to the casing 11. The tread material is applied in overlapping strips as illustrated in FIG. 5. Thus, when the sensing roller 18 is riding "higher" than the cam controlled stitcher box 83 (thereby indicating a thicker application of ribbon 10 than desired), the azimuth motor 32 will be operated to spread the continuous strip 10 of material further away from the previous turn which has been applied to the casing 11. This action will cause the sensing roller 18 to ride down the new strip 10 until it actuates the switch 14, thus stopping the azimuth movement.

In the disclosed embodiment of the invention, the azimuth motion, that is the movement of the sensing arm 19, is initiated by a spin switch 89 which is actuated once during each rotation of the tire casing 11. The resultant delay insures that the sensing roller 18 which is located on the opposite side of the tire casing 11 from the applicator arm 21 will be measuring the latest turn applied. A plurality of switches 91A, 91B, 91C and 91D are mounted on the frame 67 to engage the respective stop members 92A, 92B, 92C and 92D on the template 17 to start and stop the winding cycles. Switches 91A and 91C are start switches and 91B and 91D are stop switches in a typical two pass arrangement. The electrical drawing of FIG. 4 shows a manual start-stop and reverse arrangement to which the aforementioned switches 91A, 91B, 91C and 91D may be readily added.

In operation, the tire casing 11 is mounted on the hub 12 after the application arm 21 and the sensing arm 19 have been driven apart sufficiently to permit the mounting operation. The sensing arm 19 is moved to a zero position as indicated on the azimuth base. A template 17 is then selected to correspond to the particular tire size being produced and is mounted on the head 68. The template 17 need not be the same size as the finished tread contour and conventionally a 2:1 ratio is employed.

Since the cam follower 16 and the sensing roller 18 are synchronized and interlocked to an electrical circuit which controls the azimuth movement, the sensing roller 18 will describe the template contour. To be more specific, the sensing roller 18 will break the normally closed sensing switch 14 at the theoretical pass of the building contour 90. In other words, as the rubber or elastomeric ribbon 10 is being applied to the casing 11, the sensing roller 18 will ride on top of the recently applied tread until the built-up tread corresponds to the thickness indicated by the template 17. At this point, the sensing roller 18 will have traveled back far enough from its initial setting to break the sensing switch 14.

Figure 4:
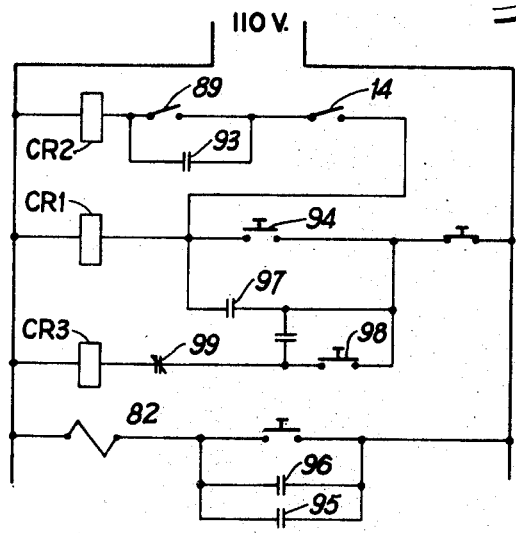
FIG. 4 is a schematic electrical drawing showing the electrical elements which are more important from the standpoint of the present invention.
Figure 4:

The spin switch 89 is closed once during each rotation of the casing 11 and if at that time the sensing switch is open, control relay CR–2 will not be operated, see FIG. 4. Relay CR–2 controls the azimuth motor 32 so that the motor 32 will not be operated and the application arm 21 will continue to apply the strip to the same portion of the casing 11. On the other hand, the sensing switch 14 will close if the sensing roller 18 detects adequate gage on the casing surface. The azimuth motor 32 will be operated during the closing of the spin switch 89 which locks across contacts 93 of relay CR–2 causing the roller 18 to move across the strip surface until a point where the next strip 10 is required to fulfill the contour requirements. The switch 14 will then open stopping the azimuth movement.

Referring to FIG. 4 of the drawings, control relay CR–1 is operated when the start switch 94 is closed. Relay CR–1 controls the tire spin drive and also the air solenoid 82 for the stitching cylinders 86 through contacts 96. Contacts 97 of relay CR–1 provide a locking arrangement after the start switch 94 is released.

Control relay CR–3 is operated by the reverse switch 98 through normally closed contacts 99 of relay CR–1. The relay CR–3 also operates the solenoid 82 through contacts 95 and the tire spin drive through a conventional relay control arrangement which is not shown. In the circuit drawing, the conventional connections with the azimuth motor 32 are not shown also since such arrangements are well known in the prior art.

The template 17 is held by the mechanical linkage in the same relationship to the rotating tire while the arms 19 and 21 are moving in the predetermined tread pattern. Thus, the centerline of the template 17 is maintained parallel to the centerline of the casing 11 to obtain the desired tread design. A typical template 17 would be at approximately a two to one ratio to the actual die size of the finished tread.

Figure 6:
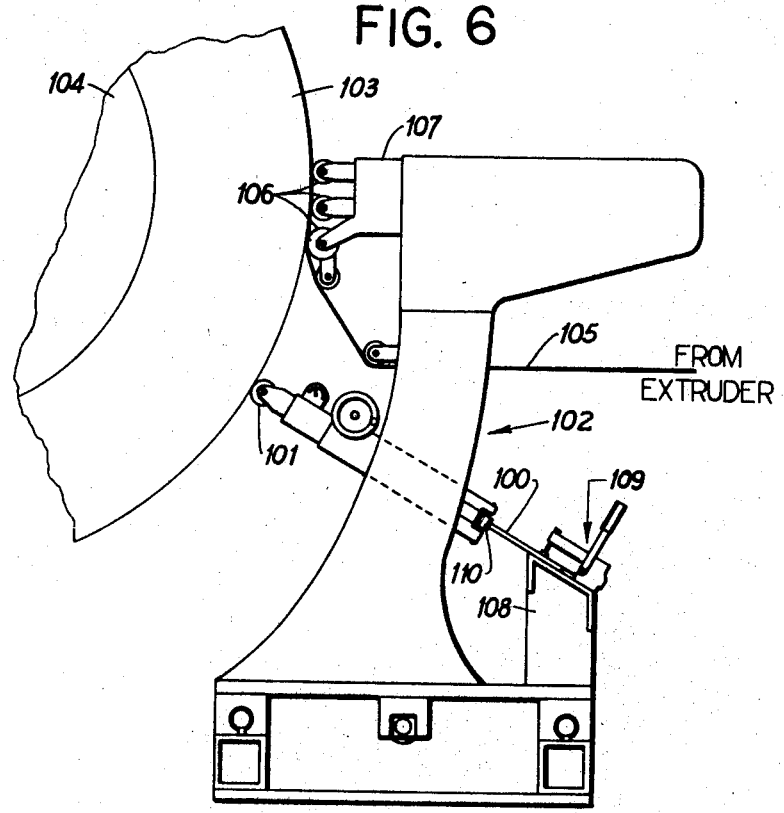
FIG. 6 is a side view showing a new tire machine incorporating the principles of the present invention.
Figure 7:
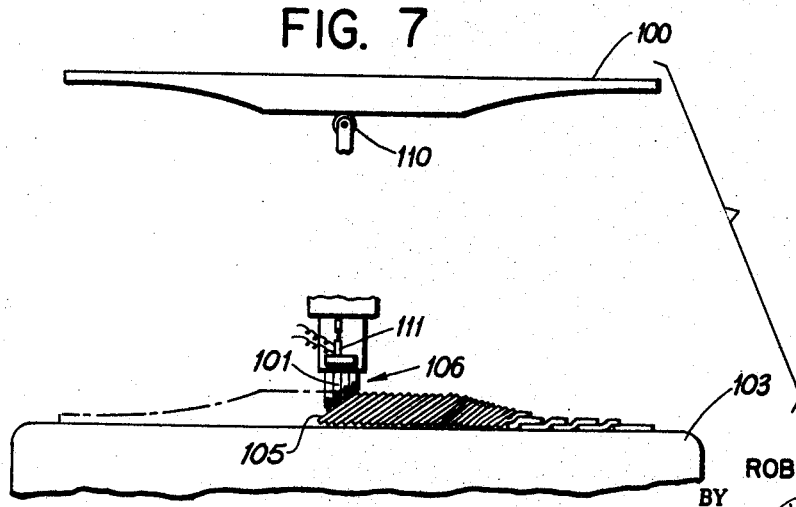
FIG. 7 illustrates schematically the application of tread material to a green tire casing to form a new tire.

In a second embodiment of the invention illustrated in FIG. 6, which is used primarily for building new tires, the template 100 and sensing roller 101 are both mounted on the application arm 102, thereby eliminating the second arm 19 shown in FIG. 1. The green tire casing 103 is mounted on a drum 104 tnd an elastomeric ribbon 105 is applied to the straight tire configuration in a plurality of overlapping turns by the application and stitching rollers 106. A sensing roller 101 and switch 111 are mounted below the applicator head 107 to sense the position of the ribbon 105 in a manner previously described with reference to FIGS. 1 and 2. A template 100 having a "straight" surface, see FIG. 7, is mounted on the support 108 and held in position by clamping means 109. The roller 110 traces the outline of the template 100 while the sensing roller 101 monitors the position of the tread material 105 on the green tire 103 and activates the drive means (not shown) to space the ribbon in order to obtain the desired tread configuration. Since the apparatus functions and is controlled in a manner similar to that previously described with reference to the retread apparatus, the obvious details of the description are being omitted.

It is to be understood that the above-described arrangements are simply illustrative examples of the application of the principles of the invention. Numerous other arrangements may be readily devised by those skilled in the art which will embody the principles of the invention and fall within the spirit and scope thereof.

What is claimed is:

1. In an apparatus for applying a strip of tread material to a rotating tire casing, the combination comprising:
   means for sensing the tread material after it is applied to the casing and producing a resultant output signal,
   a template representative of the tread configuration to be applied to the casing,
   means for comparing the output of the above-mentioned sensing means with the output signal from sensing the template configuration, and
   means for controlling the distance between adjacent strips to produce a tread thickness at each point across the tire casing which will correspond to the template configuration at that point.

2. An apparatus for applying a strip of tread material to a rotating tire casing in accordance with claim 1 wherein the means for sensing the tread material comprises:
   a roller for monitoring the strip after it has been applied,
   means for maintaining the roller in contact with the casing, and
   switch means coupled to the roller to be operated by the roller when the tread thickness corresponds to the template dimension, thereby activating the means for controlling the distance between adjacent strips.

3. An apparatus for applying a continuous strip of material to a tire casing comprising:
   means for rotating the tire casing about its central axis,
   feed means for applying the continuous strip to the tire casing,
   means for moving the feed means transversely with reference to the tire casing to apply the strip in a series of overlapping turns,
   a template representative of the finished contour of the tire casing after the strip has been applied thereto, and
   means for sensing the continuous strip of material on the tire casing, said means being coupled to the means sensing the template configuration and activating the means for moving the feed means transversely to space the succeeding turn of the strip in a predetermined manner in order to conform to the template configuration.

4. An apparatus for applying a continuous strip of material to a tire casing according to claim 3 wherein the feed means for applying the strip comprises:
   a source for continuously supplying a strip of elastomeric ribbon, and
   an applicator arm having a plurality of rollers mounted thereon, said arm being mounted for rotational movement relative to the tire casing to apply the strip to the casing by means of said rollers and said applicator arm being coupled to the sensing means which activate the means for moving said arm.

5. An apparatus for applying a continuous strip of material to a tire casing in accordance with claim 3 wherein the means for moving the feed means transversely with reference to the tire casing comprises:
   a drive motor coupled to said feed means to move said feed means and space a succeeding turn away from the preceding turn, said drive means also being coupled to the sensing means to move said sensing means transversely with reference to the casing and in synchronization with the feed means.

6. An apparatus for applying a continuous strip of material to a tire casing in accordance with claim 3 wherein the template comprises:
a planar member, the edge of said member corresponding to the contour of the finished casing and said template edge being continuously monitored by the sensing means.

7. An apparatus for applying a continuous strip of material to a tire casing in accordance with claim 3 wherein the means for sensing the strip of material on the tire casing comprises:
a sensing arm mounted for rotational movement relative to the tire casing in synchronization with the feed means,
at least one sensing roller slidably mounted on said arm in contact with said casing to monitor the strip after it has been applied, and
switch means activated by the roller when the applied strip conforms to the template configuration to activate the means for moving the feed means to space the succeeding turn of the strip at a predetermined distance from the preceding turn.

8. An apparatus for applying a continuous strip of material to a tire casing in accordance with claim 5 further including:
means for activating the drive motor at least once during each revolution of the tire casing provided the sensing means determines that the strip thickness at the point of sensing conforms to the finished template dimension.

9. An apparatus for applying a continuous strip of material to a tire casing in accordance with claim 7 wherein:
the template is mounted to the sensing means so as to maintain the same relative position with reference to the tire casing despite the transverse movement of the sensing means.

10. An apparatus for applying a continuous strip of material to a tire casing in accordance with claim 7 wherein:
the sensing roller is backed by a fluid cylinder to maintain said roller in contact with the strip, and
the sensing arm includes a slidable head portion having the roller mounted thereon and fluid drive means and associated valve means coupled to the head and to the template to regulate the movement of the head in accordance with the template configuration.

11. An apparatus for applying a continuous strip of material to a tire casing in accordance with claim 7 wherein:
the sensing arm is coupled to means for moving the feed means to drive said arm in synchronization therewith and the template is rotatably coupled to the means for moving the feed means to move the template in a direction opposite to that of the sensing arm and thus maintain the template in the same position relative to the surface of the casing.

12. An apparatus for applying a continuous strip of material to a tire casing in accordance with claim 6 wherein:
the template includes switch actuator means mounted thereto, and
the sensing means includes switch means mounted thereto to engage the actuator means for starting and stopping the movement of the sensing means and the means for moving the feed means.

13. An apparatus for applying a continuous strip of material to a tire casing in accordance with claim 3 wherein:
the means for moving the feed means includes switch means operated at least once during each revolution of the tire casing, and
the means for sensing the continuous strip includes separate switch means connected in series with the switch means associated with the means for moving the feed means and operable when the tread configuration corresponds to the template configuration to activate the means for moving the feed means when the first mentioned switch is closed.

14. The method of controlling the winding of a continuous strip of material on a tire casing which comprises the steps of:
winding a continuous strip on a rotating tire casing in a series of overlapping turns,
sensing the strip configuration after it has been applied to the casing,
tracing a template configuration which corresponds to the desired tire configuration, with a control means,
comparing the output signal obtained from sensing the strip configuration with the output signal obtained from tracing the template configuration at each particular point across the tire surface, and
positioning a succeeding winding at a predetermined distance from the sensed winding to make the wound tire casing conform to the template configuration.

15. The method of controlling the winding of an elastomeric ribbon on a tire casing comprising the steps of:
winding a continuous ribbon on a rotating tire casing in a plurality of progressive turns,
sensing the ribbon after it has been applied to the casing, and
controlling the winding pattern to conform with a predetermined template configuration by operating drive means to move the ribbon transversely with reference to the casing to space a succeeding winding from the preceding winding when the casing configuration at a particular point being sensed corresponds to the template configuration.

References Cited
UNITED STATES PATENTS

| | | | |
|---|---|---|---|
| 3,251,722 | 5/1966 | Holman | 156—130 |
| 3,268,380 | 8/1966 | Guichon et al. | 156—130 |
| 3,325,072 | 6/1967 | Black et al. | 156—405 X |
| 3,355,339 | 11/1967 | Hineline | 156—130 X |

HAROLD ANSHER, Primary Examiner

U.S. Cl. X.R.

156—351, 405